United States Patent
Sander et al.

(10) Patent No.: US 10,146,575 B2
(45) Date of Patent: *Dec. 4, 2018

(54) HETEROGENEOUS ENQUEUING AND DEQUEUING MECHANISM FOR TASK SCHEDULING

(71) Applicant: Advanced Micro Devices, Inc., Sunnyvale, CA (US)

(72) Inventors: Benjamin Thomas Sander, Austin, TX (US); Michael Houston, Cupertino, CA (US); Newton Cheung, San Jose, CA (US); Keith Lowery, Garland, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 15/250,385

(22) Filed: Aug. 29, 2016

(65) Prior Publication Data

US 2016/0371116 A1  Dec. 22, 2016

Related U.S. Application Data

(63) Continuation of application No. 13/292,740, filed on Nov. 9, 2011, now Pat. No. 9,430,281.

(60) Provisional application No. 61/423,847, filed on Dec. 16, 2010.

(51) Int. Cl.
  *G06F 9/46* (2006.01)
  *G06F 9/48* (2006.01)

(52) U.S. Cl.
  CPC .................................. *G06F 9/4881* (2013.01)

(58) Field of Classification Search
  None
  See application file for complete search history.

(56) References Cited

U.S. PATENT DOCUMENTS

| | | | |
|---|---|---|---|
| 7,716,249 B2 | 5/2010 | Harris et al. | |
| 7,750,913 B1 | 7/2010 | Parenteau et al. | |
| 9,430,281 B2 * | 8/2016 | Sander | G06F 9/4881 |
| 2007/0283356 A1 | 12/2007 | Du et al. | |
| 2008/0276220 A1 | 11/2008 | Munshi et al. | |
| 2009/0328047 A1 | 12/2009 | Li et al. | |
| 2011/0115802 A1 | 5/2011 | Mantor | |
| 2011/0161637 A1 | 6/2011 | Sihn | |

\* cited by examiner

*Primary Examiner* — Kenneth Tang
(74) *Attorney, Agent, or Firm* — Volpe and Koenig, P.C.

(57) ABSTRACT

Methods, systems and computer-readable mediums for task scheduling on an accelerated processing device (APD) are provided. In an embodiment, a method comprises: enqueuing one or more tasks in a memory storage module based on the APD; using a software-based enqueuing module; and dequeuing the one or more tasks from the memory storage module using a hardware-based command processor, wherein the command processor forwards the one or more tasks to the shader cote.

20 Claims, 4 Drawing Sheets

HETEROGENEOUS ENQUEUING AND DEQUEUING MECHANISM FOR TASK SCHEDULING

CROSS REFERENCE TO RELATED APPLICATIONS

This application is a continuation of U.S. patent application Ser. No. 13/292,740, filed Nov. 9, 2011, which claims the benefit of U.S. Provisional Application No. 61/423,847, filed Dec. 16, 2010, which are incorporated by reference as if fully set forth.

FIELD OF INVENTION

The present invention is generally directed to computer systems. More particularly, the present invention is directed to processor task scheduling within a computing system.

BACKGROUND

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to 2D and 3D graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) programming model, (iv) compiling to multiple target instruction set architectures, and (v) providing quality of service (QoS) guarantees between processes, (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In another example, a GPU in a traditional computing system, cannot schedule its own tasks. Instead, the GPU sends a signal to a CPU and has the CPU schedule the processing. When the CPU receives the signal, it schedules tasks in a memory storage module for GPU to process. The GPU reads those tasks from the memory storage module and subsequently processes these tasks. This procedure unnecessarily diverts the CPU resources to task scheduling for the GPU.

SUMMARY

What is needed, therefore, are systems and techniques to overcome the task scheduling limitations of conventional systems. Embodiments of the present invention provide a heterogeneous enqueuing and dequeuing mechanism for an APD task scheduling including an architecture for unifying CPUs, GPUs and/or APUs in a flexible computing foundation.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Embodiments of the present invention include a method for task scheduling on a processor. The method includes enqueuing one or more tasks in a memory storage module, using a software-based enqueuing module and dequeuing the one or more tasks from the memory storage module using a hardware-based command processor. The command processor forwards the one or more tasks to the shader core.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

DETAILED DESCRIPTION OF THE PREFERRED EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
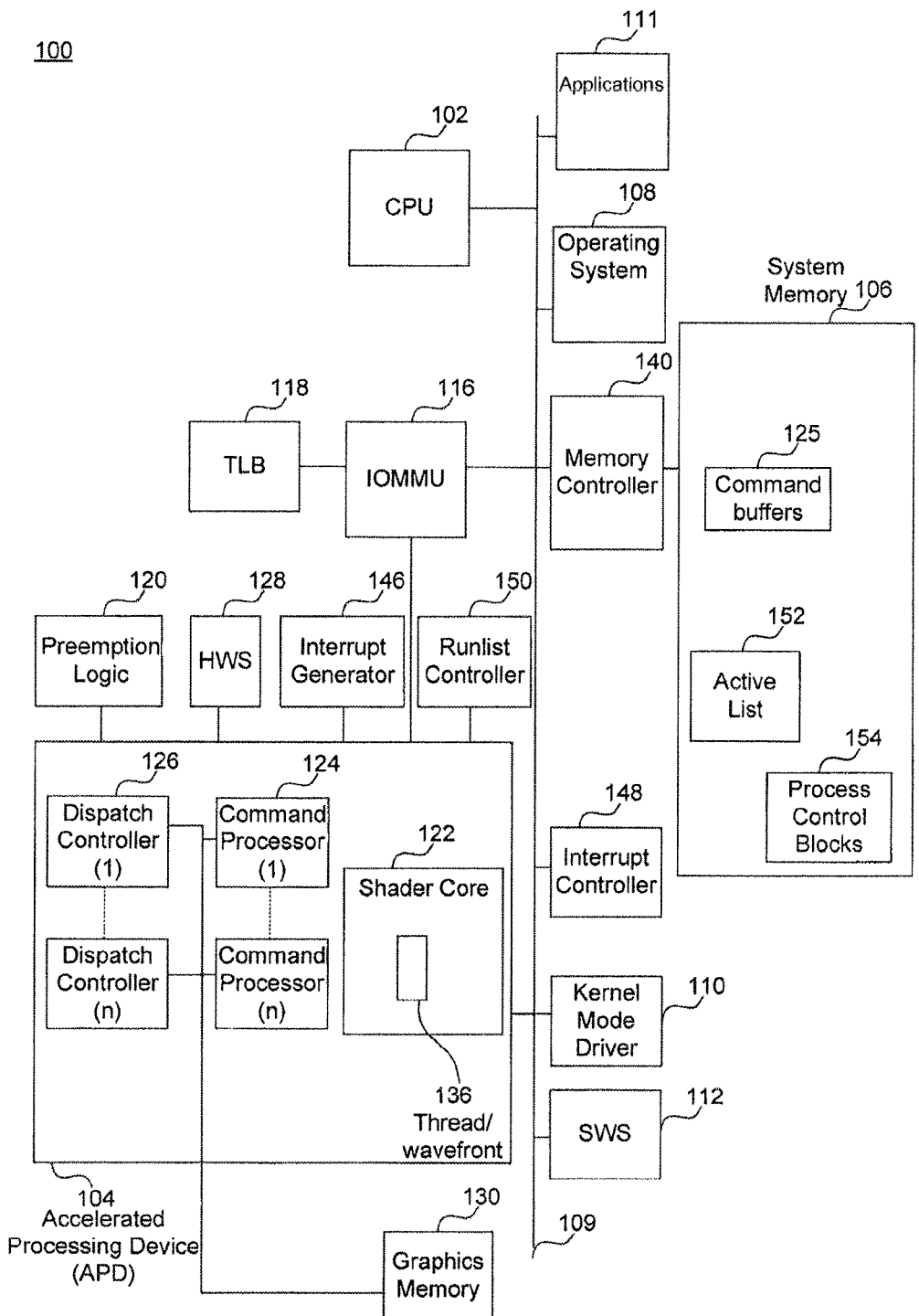
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
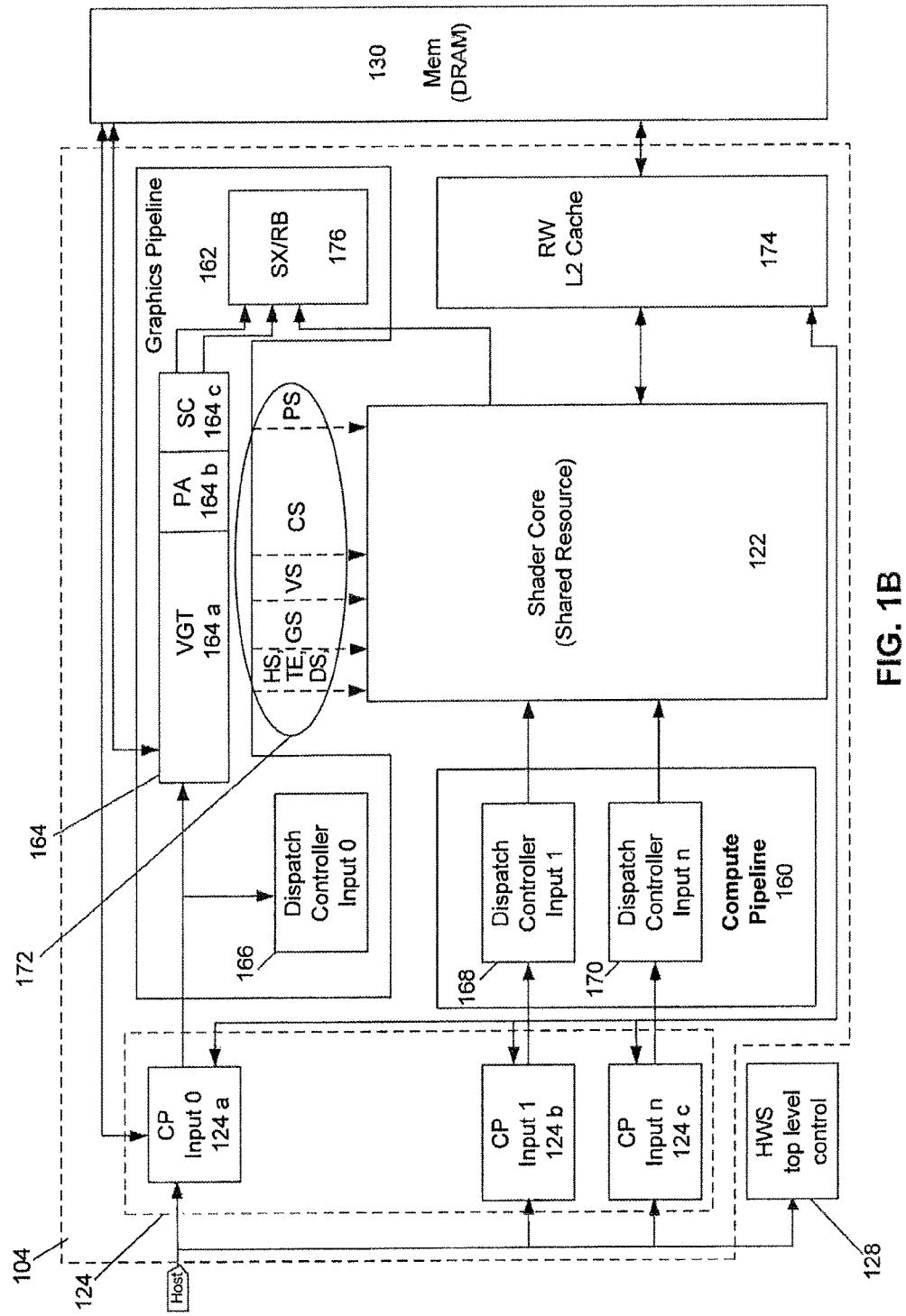
FIG. 1B is an illustrative block diagram illustration of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the API).

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
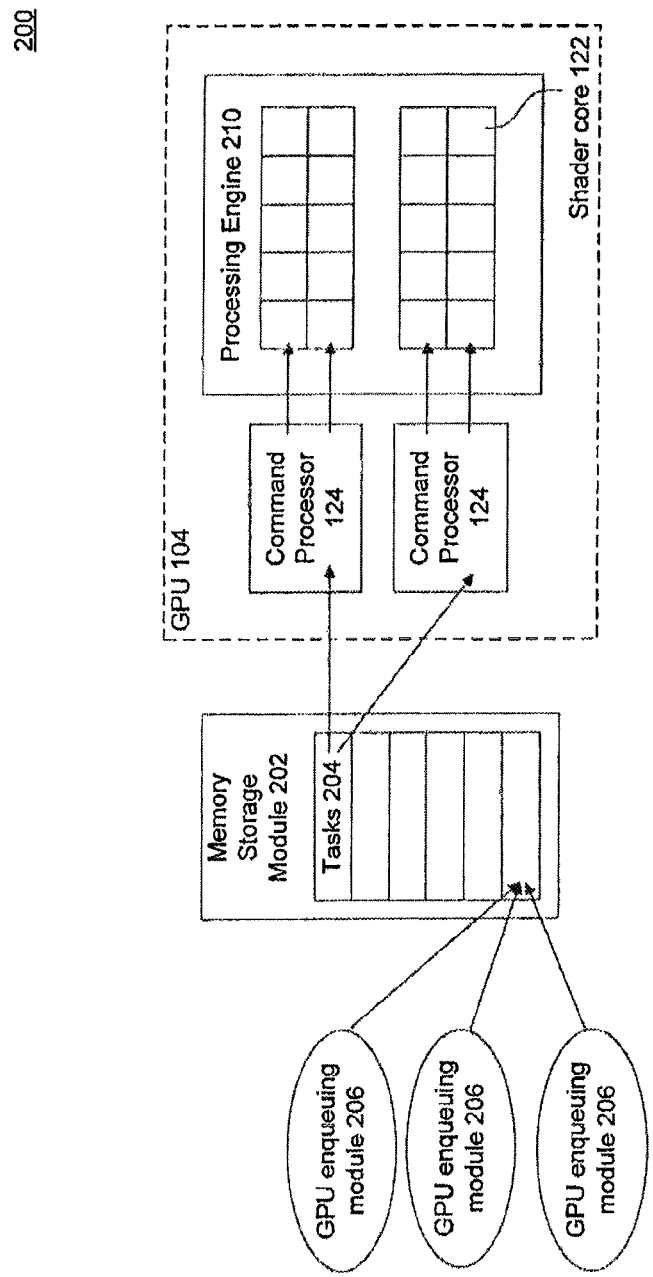
FIG. 2 is an illustrative block diagram of heterogeneous memory storage system that a GPU uses to enqueue tasks to itself for future processing.

FIG. 2 is a block diagram of a queuing system 200 where an APD enqueues tasks to itself using heterogeneous devices. Queuing system 200 includes a memory storage module 202, tasks 204, an APD enqueuing module 206, CP 124 described herein, an APD processing engine 210 and shader core 122.

Memory storage module 202 is, in the exemplary embodiment, a memory storage space allocated from system memory 106. Memory storage space 202 may be a private memory queue accessible only to APDs 104. A queue typically operates according to the first-in, first-out ("FIFO"), principle. Namely, the workloads that are first enqueued onto a queue, are the workloads that are first dequeued from a queue. A private queue is a queue visible only to a particular APD 104 or a group of APDs 104. Additionally, a person skilled in the art will appreciate that example using a queue data structure is given by way of example and not limitation and that other data structures for may be used.

Memory storage module 202 stores multiple tasks 204. Tasks 204 are independent jobs comprising operating system instructions, applications instructions, images and data scheduled for processing on APDs 104. Operating environment 200 may include hundreds of memory storage modules 202 and thousands of tasks 204.

Memory storage module 202 is accessible by heterogeneous devices such as, for example, software-based APD enqueuing module 206 and hardware based CP 124. APD enqueuing module 206 is a software-based module capable of enqueuing task 204 onto memory storage module 202. APD enqueuing module 206 enqueues tasks 204 using an atomic operation. A person skilled in the art will appreciate that an atomic operation prevents an enqueuing module from reading from or writing to a memory location while another device accessing the same memory location(s) completes its access.

Multiple APD enqueuing modules 206 can enqueue tasks 204 on to the same memory storage module 202 or multiple memory storage modules 202. A programming language, such as OpenCL is used to develop software to store on memory module 202. OpenCL provides an intrinsic function Enqueue( ). Function Enqueue( ) enables APD enqueuing module 206 to enqueue tasks 204 on memory storage module 202 using an atomic operation.

As described herein, CP 124 is a hardware component of APD 104. CP 124 dequeues tasks 204 from memory storage module 202 and sends tasks 204 to shader cores 122 for processing. In one embodiment, CP 124 dequeues tasks 204 from multiple memory storage modules 202. In another embodiment, APD 104 includes multiple command processors 124 that remove tasks from memory storage module 202.

In one embodiment, CP 124 may be a fixed-function device. In another embodiment, CP 124 can be manipulated using microcode or other forms of software. A person skilled in the art will appreciate that microcode includes hardware-level instructions stored in high-speed memory, such as graphics memory 130, which translates computing device instructions into circuit-level operations. Application developers use microcode to control and alter behavior of hardware devices, such as CP 124. Instructions for microcode may be written using hardware programming languages, such as, OpenCL.

CP 124 also uses blocking and non-blocking atomic operations to manipulate tasks 204 on memory storage module 202. In a blocking operation, CP 124 "locks" memory storage module 202 and prevents other processes and/or hardware from accessing memory storage module 202 until CP 124 unlocks memory storage module 202 (or portion thereof) and retrieves tasks 204. In a non-blocking operation, CP 124 attempts to remove tasks 204 and update memory storage module 202. If CP 124 fails to update memory storage module 202, CP 124 makes another attempt to remove tasks 204.

Memory storage module 202 manipulates tasks 204 using a task data structure, such as, for example, MyTask structure described below. Each MyTask structure includes instructions and data for APD 104 to process each task 204, using APD enqueuing module 206 and CP 124.

A MyTask structure, described below, can be programmed using a programming language, such as OpenCL. The programmed MyTask structure is compiled into a set of instructions and stored in system memory 106 or APD memory 130. The MyTask structure is implemented to access functions and data that are being executed on CPU 102 and APD 104. In a non-limiting example, the MyTask structure includes the parameters below:

```
struct MyTask {
    MyPtr _myCodePtr
        myCPUCodePtr : pointer to code (x86 binary format)
        myAPDCodePtr :
            //GPR usage in kernel
            //LDS required by kernel
            //Pointer to code (shader binary format)
            //other parameters
    MyPtr _myDataPtr :
        myExecRange:
            //Global grid dimensions
            //Local grid dimensions
        myArgSize
        myArgs {(variable size)}
    MyNotification
        Pointer to doorbell/queue notification mechanism
}
```

The MyTask structure includes pointers to a compiled CPU code and APD microcode stored in system memory 106 or another memory device described herein.

In the example above, a pointer to APD code is myAPDCodePtr, and a pointer to CPU code is myCPUCodePtr, which are defined as _myCodePtr. The myAPDCodePtr includes parameters that point to general purpose register ("GPR") usage required by the kernel, local data share (LDS) memory required by the kernel and a pointer to a memory space storing the compiled code for the shader.

When APD enqueuing module 206 enqueues tasks 204 on memory storage module 202, APD enqueuing module 206 uses the MyTask structure. APD enqueuing module 206 provides the parameters in MyTask structure that include information to the memory address that stores data (such as the MyDataPtr described herein), as well as a pointer to code that CP 124 requires to dequeue task 204.

After CP 124 dequeues task 204 from the memory storage module 202, tasks 204 are sent for processing on one or more shader cores 122. APD 104 uses the MyTask structure to determine the amount of resources required to process task on each shader core 122. The amount of resources can include a number of working items and amount of local APD memory space. In an embodiment, the resource information is at a memory location addressed using an myAPDCodePtr pointer.

The MyTask structure also includes a pointer identified as myDataPtr. The myDataPtr is a pointer to a memory location which stores data for processing on CPU 102 or APD 104. The myDataPtr includes parameters for arguments, a parameter for a number of arguments, parameter for data size, and other criteria known to a person skilled in the relevant art. Also, myDataPtr store an address of the memory location that stores data from task 204 that requires processing.

Figure 3:
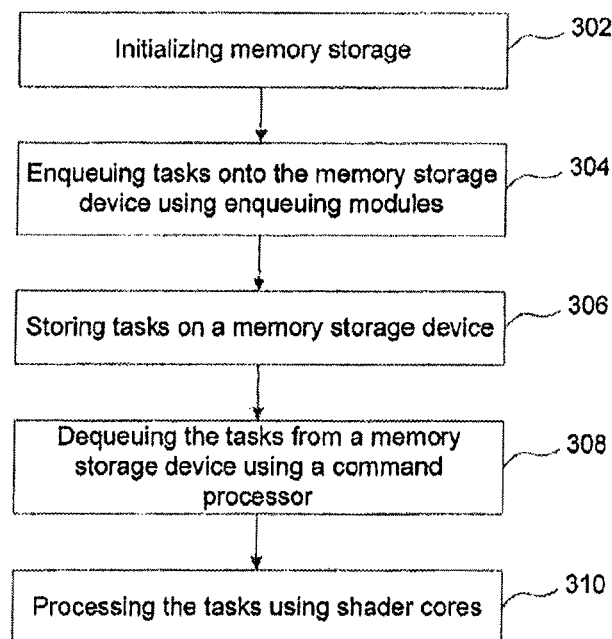
FIG. 3 is an illustrative flowchart of an APD enqueuing tasks to itself for processing.

FIG. 3 is a flowchart 300 of the APD enqueuing tasks to itself for processing. At operation 302, memory space for memory storage module 202 is allocated in system memory 106. At operation 304, APD enqueuing modules 206 enqueue tasks 204 on memory storage module 202, as described herein. In an embodiment, APD enqueuing module 206 enqueues tasks 204 using an atomic operation.

At operation 306, memory storage module 202 stores tasks 204 enqueued in operation 304. Memory storage module 202 stores tasks 204 until APD 104 requests CP 124 to dequeue tasks 204 for processing on shader cores 122. At operation 308, CP 124 dequeues tasks 204 from memory storage module 202. After CP 124 dequeues tasks 204, APD 104 uses the MyTask structure to determine the resources that are required to process task 204. At operation 310, tasks 204 dequeued in operation 308 are processed by shader core 122. As a result of the operations described in flowchart 300, the APD is able to enqueue workload to itself.

Various aspects of the present invention can be implemented by software, firmware, hardware, or a combination thereof. For example, the methods illustrated by flowcharts 300 of FIG. 3 can be implemented in unified computing system 100 of FIG. 1A. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be memory semiconductors (e.g., DRAMs, etc.). These computer program products are means for providing software to unified computing system 100.

CONCLUSION

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for task scheduling on an accelerated processing device (APD), comprising:
    on a condition that the APD determines to enqueue one or more tasks, enqueuing, by enqueuing circuitry based on the APD, the one or more tasks in a memory storage device; and
    on a condition that the APD requests dequeuing by command processor circuitry based on the APD, dequeuing, by the command processor circuitry, the one or more queued tasks from the memory storage device;
    wherein the command processor circuitry retrieves the one or more queued tasks from the memory storage device and forwards the retrieved one or more queued tasks to a shader core of the APD for execution of the retrieved one or more tasks by the shader core.

2. The method of claim 1, wherein the memory storage device comprises a private memory queue.

3. The method of claim 1, further comprising:
    accessing a function code in each task to enqueue and dequeue each task.

4. The method of claim 1, wherein the enqueuing circuitry enqueues the one or more tasks using an atomic operation.

5. The method of claim 1, wherein the command processor circuitry dequeues the one or more tasks using an atomic operation.

6. The method of claim 1, wherein the command processor circuitry uses a blocking mechanism to dequeue the one or more tasks.

7. The method of claim 1, wherein the command processor circuitry uses an unblocking mechanism to dequeue the one or more tasks.

8. A task scheduler for an accelerated processing device (APD), comprising:
    enqueuing circuitry configured to enqueue the one or more tasks onto a memory storage device on a condition that the APD determines to enqueue one or more tasks; and
    command processor circuitry based on the APD configured to dequeue the one or more queued tasks from the memory storage device for processing on a shader core of the APD on a condition that the APD requests dequeuing by the command processor;
    wherein the command processor circuitry retrieves the one or more tasks from the memory storage device and forwards the retrieved one or more tasks to the shader core for execution of the retrieved one or more tasks by the shader core.

9. The task scheduler of claim 8, wherein the memory storage device comprises a private memory queue.

10. The task scheduler of claim 8, wherein the enqueuing circuitry and command processor circuitry access a code stored in each task to enqueue and dequeue each task.

11. The task scheduler of claim 8, wherein the enqueuing circuitry uses an atomic operation to access the memory storage device.

12. The task scheduler of claim 8, wherein the command processor circuitry uses a microcode to dequeue one or more tasks.

13. The task scheduler of claim 8, wherein the command processor circuitry uses a blocking mechanism to dequeue the one or more tasks.

14. The task scheduler of claim 8, wherein the command processor circuitry uses an unblocking mechanism to dequeue the one or more tasks.

15. An article of manufacture including a computer-readable medium having instructions stored thereon that, when executed by a computing device, cause said computing device to perform operations for task scheduling on an accelerated processing device (APD), comprising:
    on a condition that the APD determines to enqueue one or more tasks, enqueuing, by a software-based enqueuing device based on the APD, the one or more tasks a memory storage device; and
    on a condition that the APD requests dequeuing by command processor circuitry based on the APD, dequeuing, by the command processor circuitry, the one or more queued tasks from the memory storage device;
    wherein the command processor circuitry retrieves the one or more tasks from the memory storage device and forwards the retrieved one or more tasks to a shader core of the APD for execution of the retrieved one or more tasks by the shader core.

16. The article of manufacture of claim 15, wherein the memory storage device comprises a private memory queue.

17. The article of manufacture of claim 15, further comprising:
    accessing a function code in each task to enqueue and dequeue each task.

18. A computer-readable medium having instructions recorded thereon that, when executed by a computing device, cause the computing device to perform operations to task schedule on a processor, comprising:
    on a condition that an accelerated processing device (APD) determines to enqueue one or more tasks, enqueuing, by a software-based enqueuing device based on the APD, the one or more tasks in a memory storage device; and on a condition that the APD requests dequeuing by command processor circuitry based on the APD, dequeuing, by the command processor circuitry, the one or more queued tasks from the memory storage device;

wherein the command processor circuitry retrieves the one or more tasks from the memory storage device and forwards the retrieved one or more tasks to a shader core of the APD for execution of the retrieved one or more tasks by the shader core.

19. The computer-readable medium of claim 18, wherein the memory storage device comprises a private memory queue.

20. The computer-readable medium of claim 18 further comprising:

accessing a function code in each task to enqueue and dequeue each task.

* * * * *